Aug. 2, 1966  G. T. WRIGHT  3,264,533
THREE-ELECTRODE ELECTRICAL TRANSLATING DEVICE AND
FABRICATION THEREOF
Filed May 17, 1960  3 Sheets-Sheet 1
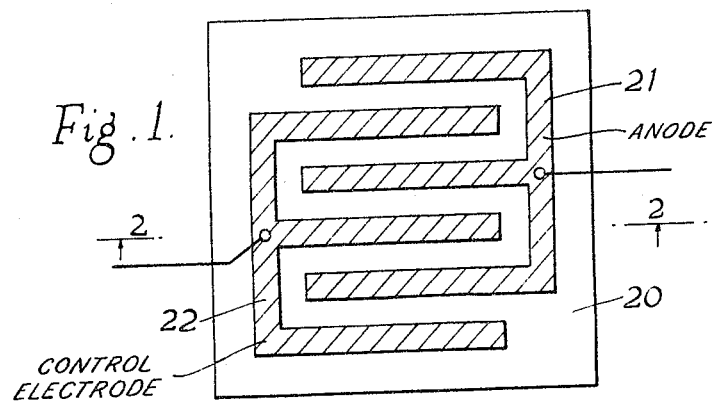
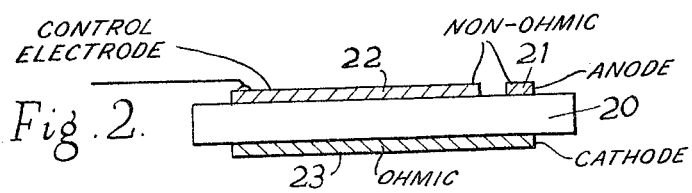
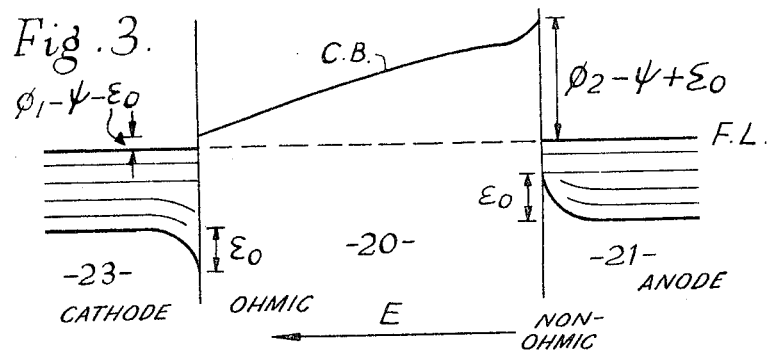
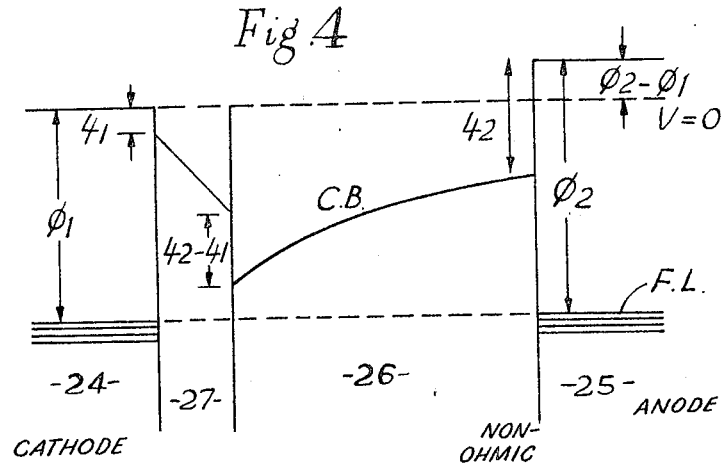

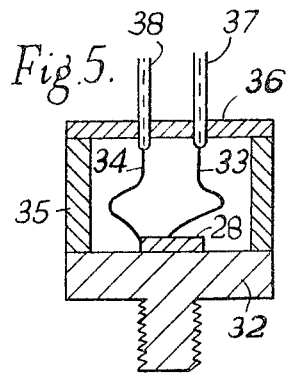
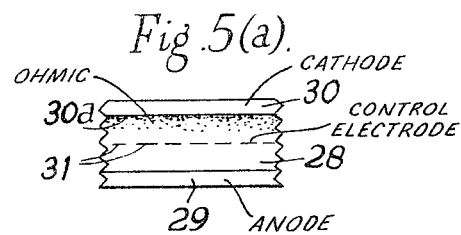
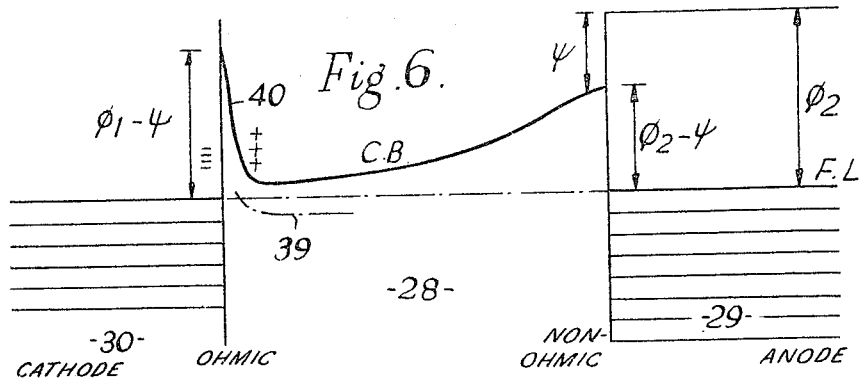
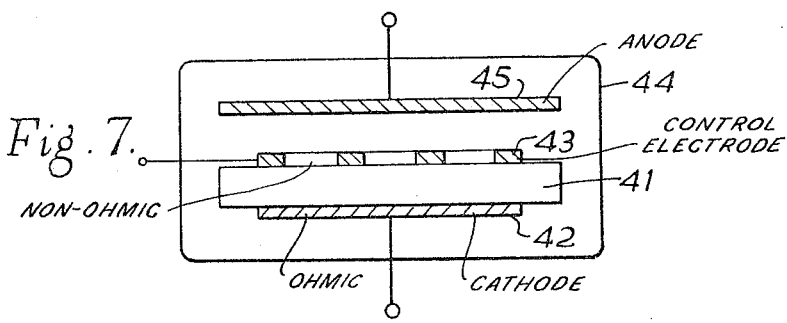
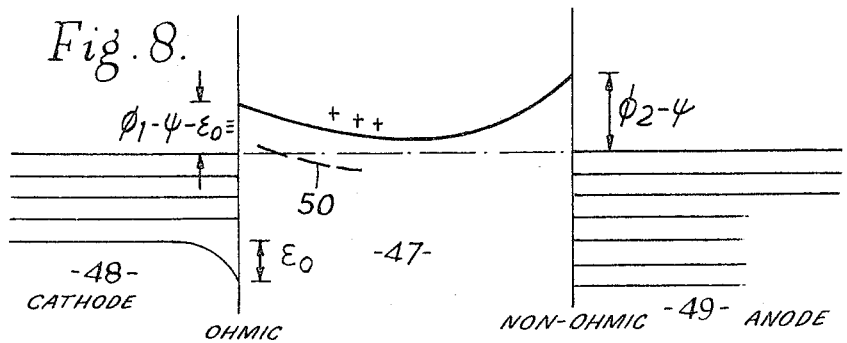

Aug. 2, 1966  G. T. WRIGHT  3,264,533
THREE-ELECTRODE ELECTRICAL TRANSLATING DEVICE AND
FABRICATION THEREOF
Filed May 17, 1960  3 Sheets-Sheet 3
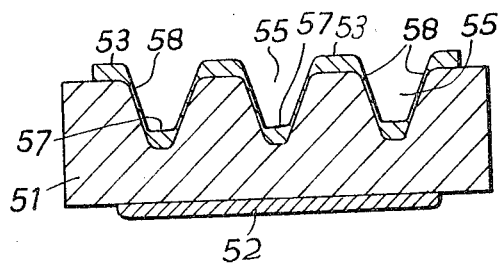
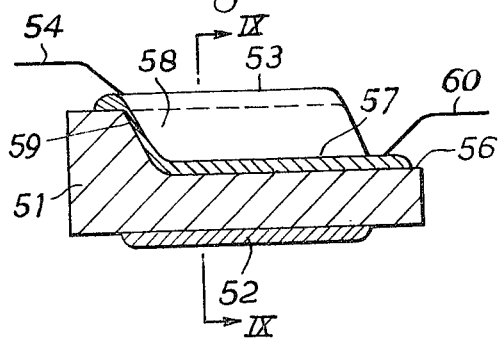
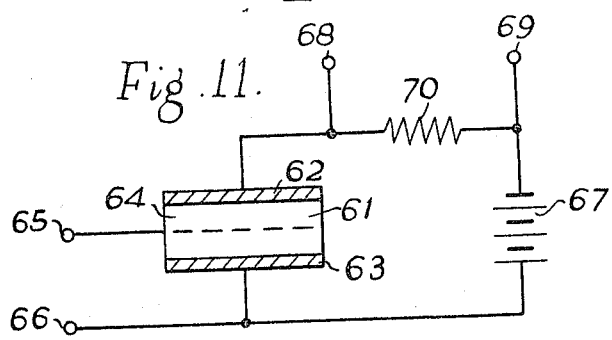

United States Patent Office 3,264,533
Patented August 2, 1966

3,264,533
THREE-ELECTRODE ELECTRICAL TRANSLATING DEVICE AND FABRICATION THEREOF
Gordon Thomas Wright, % Electrical Engineering Dept., The University, Edgbaston, Birmingham 15, England
Filed May 17, 1960, Ser. No. 29,691
Claims priority, application Great Britain, May 19, 1959, 17,023/59
32 Claims. (Cl. 317—235)

The present invention relates to electrical translating devices, such as rectifiers, amplifiers, and electromechanical transducers, which give an electrical or other output corresponding in some way to an input electrical or other signal. It is particularly concerned with solid-state devices of this kind utilizing space-charge-limited currents carried through insulating or other crystalline materials by electrons or positive holes.

The present application forms a continuation-in-part of my application Serial No. 767,195, filed October 14, 1958, now abandoned.

It is an object of the present invention to provide an improved solid-state electrical translating device utilizing space-charge-limited currents.

It is a further object of the invention to provide a three-electrode solid-state electrical translating device having properties similar to those of the vacuum triode.

In accordance with the invention an electrical translating device comprises a body of crystalline material having two opposed faces, a first electrode forming an ohmic contact to one of said faces, a second electrode, and a third electrode disposed between said first and second electrodes and forming a non-ohmic contact with said body, one of said second and third electrodes being in contact with the other of said faces of the body, and said body having a low density of trapping states whereby a space-charge-limited current of injected carriers may flow between said first and second electrodes under the control of the potential applied to said third electrode.

The expression "ohmic contact" is here used in the sense of a contact having a linear current-voltage characteristic for both directions of current flow over a substantial range of applied voltages and enabling the injection of charge-carriers, either electrons or positive holes, into the body of crystalline material. When conduction is by means of electrons injected at the ohmic contact and passing through the conduction band of the crystal the first electrode is the cathode of the device.

The invention will now be described by way of example with reference to the accompanying drawings, in which:

FIG. 1 is a diagrammatic plan view of one embodiment of the invention,

FIG. 2 is a section on the line II—II of FIG. 1,

FIG. 3 is a schematic diagram of the electron energy levels for the embodiment of FIGS. 1 and 2, FIG. 4 is a schematic diagram of the electron energy levels for a modified form of the embodiment of FIGS. 1 to 3, FIG. 5 is a section through a second embodiment of a device in accordance with the invention, FIG. 5(a) is a detail of FIG. 5 on an enlarged scale, FIG. 6 is a schematic diagram of the electron energy levels for the embodiment of FIGS. 5 and 5(a), FIG. 7 is a diagrammatic cross-section of a third embodiment of the invention, FIG. 8 is a schematic diagram of the electron energy levels for a fourth embodiment of the invention, FIG. 9 is a cross-section along the line IX—IX of FIG. 10 of a further embodiment of the invention, and FIG. 10 is a cross section of a further embodiment of the invention, FIG. 11 is a circuit diagram of an amplifying circuit incorporating a device in accordance with the invention.

In FIG. 1 is shown a crystal 20 of lead zirconate with an anode 21 and a control electrode 22 on one face. The anode 21 and control electrode 22 are in the form of interdigitally arranged spaced parallel bars and may be applied by vacuum evaporation of silver through a mask. As seen in the section of FIG. 2 a cathode 23 is formed on the face of the crystal 20 opposite that to which the anode 21 and control electrode 22 are affixed. The cathode 23 may be applied by firing on an adherent layer of silver, making use of a proprietary paste.

In the device of FIGS. 1 and 2 the ohmic contact at the cathode results from the action of the strong external field of the ferro-electric lead zirconate crystal. The ferro-electric crystal 20 may be initially polarized by the application of a field, producing a strong external field acting in the same direction as the applied field, that is to say into the cathode 23. FIG. 3 is the electron energy level diagram for the case in which no potential is applied to the control electrode, in which $\phi_1$ and $\phi_2$ are the work functions of the cathode and anode surfaces, $\psi$ the electron affinity of the crystal, and $\epsilon_0$ represents the change in energy levels due to the external field of the crystal. The conventional direction of the external field of the crystal is shown at E. The Fermi Level is indicated at F.L. and the lower boundary of the empty conduction band of the insulating crystal at C.B.

It will be seen that the conduction band of the crystal 20 has been brought down close to the Fermi Level at the interface with the cathode 23 so that by the application of an external field electrons can be drawn from the cathode 23 into the conduction band of the crystal 20. These electrons can then carry a current through the crystal to the anode 21 falling through a potential of $\phi_2 - \psi + \epsilon_0$ on entering that electrode.

As expected from theoretical calculations this current is a space-charge-limited current and is thus proportional to the square of the applied voltage. If the voltage is greatly increased all the space-charge is drawn through the crystal and a saturation current is obtained which is approximately proportional to the applied voltage.

It will be apparent from FIG. 3 that current cannot flow through the crystal in the reverse direction owing to the potential barrier of height $\phi_2 - \psi + \epsilon_0$ at the contact between the crystal 20 and the anode 21.

The flow of space-charge-limited current between the cathode 23 and the anode 21 can be controlled by the application of a suitable potential to the control electrode 22. A negative potential applied to the control electrode will be effective to repel electrons and control the current even when a much larger positive potential is applied to the anode, since while anode current is being drawn the field due to the anode is proportional to the square root of the distance from the cathode.

In a modified form of this embodiment the cathode is an aluminium plate with an oxide film formed naturally or by anodising on its surface. The crystal is thus separated from the cathode by a dielectric film which may have a thickness of about $10^{-7}$ cm., the thickness of the crystal being typically of the order of $10^{-3}$ cm.

The electron energy levels for this system are shown in FIG. 4, in which 24 and 25 represent the cathode and anode separated by a crystal 26 an anodised film 27 being formed on the surface of the cathode 24. The external field of the ferro-electric crystal 26 acts across the film 27 and brings the conduction band of the crystal down towards the Fermi Level of the metal electrode. The film is thin enough to be almost entirely transparent to electrons drawn through it by the external field of the crystal Application of a potential difference between the elec trodes in the appropriate sense produces a current flow in which electrons move from the cathode 24 towards the anode 25. Flow of current in the reverse sense is prevented by the potential barrier of height $\phi_2 - \psi_2$ at the contact between the anode 25 and the crystal 26. A similar dielectric film of normal permittivity can be produced by suitable treatment of the crystal surface. The flow of electrons through the nearly transparent oxide film is accomplished by a principle known as the "Tunnel effect" described by C. A. Mead, U.S. Patent No. 3,056,073.

The above-described embodiments employ ferro-electric crystals but high permittivity para-electric crystals can be substituted and the devices will then function in a similar manner as long as the applied field is operative.

FIGS. 5 and 5(a) show an embodiment of the invention employing a cadmium sulphide crystal. Suitable crystals can be prepared by heating of cadmium sulphide powder in a furnace and condensation of the vapour, a mixture of rod-like and plate-like crystals being formed. Plate-like crystals with a good crystal structure are selected for use in the construction of a device. It is thought that the presence of traces of halogen, especially chlorine, in the raw cadmium sulphide powder may assist in the formation of crystals suitably free from empty trapping states. The inclusion of chlorine atoms in the crystal lattice with concomitant filling of deep trapping states by freed electrons may take place as the crystals are formed resulting in crystals with very low effective trapping state densities.

In the production of the device shown in FIG. 5 a thin cadmium sulphide crystal is chosen and a grid system of parallel bars of nickel or gold is evaporated on the surface. The crystal is then placed in a wire holder and returned to the crystal-growing furnace where the electrodes are covered over with freshly grown crystal layers. This gives a crystal with a grid embedded in it. One surface of the crystal is then heated in cadmium vapour so that it takes up cadmium and the surface layers become semi-conducting by virtue of their resulting non-stoichiometric composition. Anode and cathode can then be applied by electroplating a layer of silver on to the crystal surfaces, using a cyanide bath in the normal way. The process may be speeded up by shining a bright light on to the crystal since this produces photo-conductivity in the crystal and increases the plating current.

The edge of the crystal is etched away to enable contact to be made to the grid bars, which typically are .0005" wide and spaced apart at intervals of .001".

The crystal 28 with its anode 29, cathode 30, semiconducting region 30(a), and grid electrode 31 (FIG. 5(a)) can be encapsulated in a manner similar to those well known for semi-conductor devices. The silver anode 29 is soldered to a base support 32 and leads 33 and 34 are soldered to the cathode 30 and grid electrode 31, respectively. The base support 32 may be of a material having a low thermal expansion coefficient, such as a "Nilo K" nickel alloy. A tubular spacer 35 of glass or an impervious ceramic surrounds the crystal 28. A cap 36 is sealed to the spacer 35 and has apertures 37 and 38 through which the leads 33 and 34 are respectively sealed with insulating material.

An alternative way of forming the grid bars is to heat the electrode metal in contact with the edge of a crystal while applying a strong electric field in a direction parallel to the principal faces of the crystal to draw the metal into the crystal. In this way dendritic growths are formed in the crystal body which extend preferentially along a crystallographic axis lying parallel to the principal faces of the crystal.

FIG. 6 is an electron energy level diagram showing the cathode contact mechanism for the device of FIGS. 5 and 5(a) and similar devices in which donor centres are provided in the surface layers of a crystalline body of normal permittivity. The symbols have the same significance as those in FIG. 3. The grid electrode 31 has been omitted for greater clarity. At 39 are indicated the donor centres in the semi-conducting surface layers of the crystal 28. Electrons are transferred from these donor centres 39 into the cathode 30. The field of the double-layer thus formed acts to bring the conduction band C.B. down towards the Fermi Level F.L. of the cathode. The concentration of donor centres being high, the barrier layer 40 is so thin as to be practically transparent to electrons, which can pass from the cathode 30 into the conduction band of the crystal 28 and thence to the anode 29 under the influence of an applied field of appropriate polarity. As with the other embodiments described, however, the crystal remains insulating against passage of current in the reverse direction. The passage of electrons through nearly transparent barrier layer 40 is accomplished by the "Tunnel effect" as disclosed with reference to FIG. 4.

FIG. 7 shows diagrammatically a further embodiment which employs an ohmic contact formed by introducing donor centres into the surface layers of a ceramic material. The discontinuities in such a material at grain boundaries act as scattering centres and tend to interfere with the electron flow but a thin layer of ceramic material will only have a small number of grains between its opposed surfaces and the reduction in efficiency due to these may be compensated for by increasing the area by a large factor relative to that obtainable with single crystals.

Zinc sulphide may be prepared in the form of thin ceramic sheets by mixing the finely powdered material with a small quantity of a binder such as ammonium algineate or stearic acid dissolved in butyl alcohol or acetate and pouring the resulting cream on to a flat glass plate rotating at about 100 revs./min. Particle sizes less than 10 $\mu$, that is to say $10^{-6}$ meters, are necessary in order to get satisfactorily thin plates.

When dry the film is cut into squares and removed from the glass plate to trays of pure alumina. These squares are then sintered in an atmosphere of oxygen-free nitrogen at a temperature between 1200° C. and 1400° C.

One surface of a plate is then made semi-conducting by bombardment with electrons and a cathode is applied to this surface by vacuum deposition. A grid of parallel bars is formed on the opposite surface of the plate. As shown in FIG. 7 the plate 41 with its cathode 42 and grid of parallel bars 43 is mounted in a container 44. An anode 45 is mounted in the container 44 at a position spaced from the grid bars 43. The container 44 is then evacuated.

The application of a suitable potential difference between the anode 45 and the cathode 42 results in the establishment of a field in the plate 41 causing electrons injected through the ohmic contact at the cathode to accumulate in the surface of the plate under the grid 43. In the absence of a biassing potential on this grid 43 thermal emission of electrons takes place from the surface and a space-charge-limited current passes between the cathode and the anode which can be modulated by the application of a varying potential to the grid 43.

FIG. 8 shows the equilibrium state of the electron energy levels for a high-permittivity crystalline material 47 placed between electrodes 48 and 49 when the surface layers adjacent the electrode 48 contain donor centres 50 but retain their high permittivity. The charge transfer from the donor centres 50 is very large and the resulting double-layer field, while having little effect within the high-permittivity material 47, acts in the surface of the electrode 48 to compensate most of the difference between the work function of the electrode 48 and the electron affinity of the material 47.

One example of a device using a high permittivity material employs a single crystal of barium titanate and will operate above the Curie temperature of this material, i.e. above 120° C. Suitable thin flake crystals can be prepared by heating a mixture of barium chloride, barium carbonate, and titanium oxide in the molar ratio of about 2:2:1 in an alumina crucible. The temperature is maintained at 1150°–1200° C. for several hours and then lowered slowly (10°–100° C. per hour) to 800° C. Thereafter the mixture is allowed to cool to room temperature, this taking about 12 hours, and barium titanate, crystallised from solution in barium chloride, can be removed by dissolving the melt away with water.

The surface layers of the crystal are treated with samarium to make them semi-conducting and to reduce their permittivity to normal values. The method for introducing samarium, which has a high melting-point, is to allow sputtering to take place from a samarium cathode while the crystal is subjected to a gas discharge to produce strong local heating.

The device is formed with interdigital anode and control electrode as in the device of FIGS. 1 and 2. The cathode lead is attached to the treated surface of the crystal with a conducting cement such as colloidal graphite or cold-setting silver paste. The encapsulation of the device then proceeds in a manner similar to that described for the device of FIG. 5.

In the device of FIGS. 9 and 10, the main body of crystalline material is constituted by a plate-like crystal 51 of cadmium sulphide about $5 \times 10^{-3}$ cm. thick. A cathode contact 52 is formed on one surface of this plate by diffusing indium into the surface layers to produce donor centres. This is achieved by ultra-sonic soldering of a metal contact to the surface with an indium solder, using a pure resin flux and maintaining the soldering temperature at around 320° C. The soldering can be done in air.

With thinner crystals, of less than $2 \times 10^{-3}$ cm. thickness, which tend to buckle during soldering, a layer of gold or silver of about $10^{-5}$ cm. thickness is deposited on the surface and an indium layer of about $10^{-4}$ cm. thickness is deposited on the gold or silver layer, in each case by vacuum evaporation, the temperature being then raised to within the range 310° to 330° C. for a few minutes. Even with thicker crystals it is advantageous to deposit a layer of gold or silver before soldering since this appears to assist wetting of the surface by the indium solder.

The cathode contact 52 having been formed on one surface of the crystal 51. a grid of parallel bars 53 of aluminium is evaporated through a mask on to the opposite surface of the crystal to form an anode. The parallel anode bars 53 are joined together at one end after formation of the control electrode by evaporation of a transverse bar to which contact can be established by a lead 54.

The crystal surface is now etched away between the anode bars 53 and across the end of the anode bars remote from the end at which the transverse bar is placed. Steep-sided grooves 55 are thus formed between the anode bars, the bottoms of which are continuous with an etched-away area 56 at one end. The etching extends to a depth of about half the thickness of the crystal. The whole of the grooved surface is now treated by vacuum evaporation of aluminium to deposit a control electrode 57 on the etched-away surface of the crystal. The control electrode 57 thus takes the form of parallel bars lying in the bottoms of the grooves 55 and joined by a transverse bar covering the area 56. Aluminium is deposited at the same time over the anode bars 53 previously attached but insufficient aluminium is deposited on the steep sides 58 and ends 59 of the grooves 55 to form a conducting layer which would interconnect the anode with the control electrode. Contact is made to the control electrode 57 by a lead 60.

By the use of vacuum evaporation or sputtering, in which the material being deposited approaches the surface approximately in straight lines, selective deposition on the bottom and sides of the groove is achieved such that a conductive layer is formed in the bottom of the groove before the layer on the sides of the grooves is thick enough to become conductive. It will be apparent that the angle of the steep sides of the groove to the surface may depart considerably from 90° without losing the required differential rates of deposition on the sides and the bottom of the groove resulting from the different angles subtended at the source.

The layer on the sides of the groove may subsequently be etched away to ensure that there is no electrical contact between the control electrode in the bottom of the groove and another electrode formed on the main surface of the body. This other electrode may be formed at the same time as the control electrode or may be formed separately either before or after the formation of the control electrode. In the latter case the surface for receiving the other electrode may be masked during formation of the control electrode. The mask may be of such dimensions as to shield the sides of the grooves against deposition of electrode material.

The strength of the insulation between the anode and the control electrode is increased by depositing over the grooved surface of the crystal an insulating dielectric layer, of, for example, zinc sulphide or magnesium fluoride, which also serves to protect the electrodes. Further protection and insulation can be effected by dipping the crystal in paraffin wax.

The crystal can be encapsulated by methods similar to those used in making semiconductor devices, contact being established to the cathode and to opposite ends of the anode and control electrode bars.

The method described can be applied to any body of crystalline material, whether a ceramic or a single crystal, and in particular is applicable to the manufacture of conventional types of semiconductor device.

The devices described above operate by electron conduction and thus employ ohmic contacts allowing electron injection. In the case of conduction by positive holes an ohmic contact for injection of holes is formed at the anode of the device, for example by introducing acceptor centres into the surfaces layers.

The embodiments described have been given as examples of the wide range of materials and methods which can be used in constructing devices in accordance with the invention. The choice of ceramics or single crystals, and of the form of electrode, will depend on the applications for which the devices are intended, some examples of these applications being given below. Many of the techniques of manufacture, especially those of encapsulation, can be adapted from those developed for semiconductor devices.

While the invention is particularly concerned with insulating crystalline materials having a resistivity greater than $10^3$ ohm cm., and typically of $10^9$–$10^{11}$ ohm cm (compared with 200 ohm cm. for pure silicon as used in transistors) it is not limited to such materials since space-charge limited currents can flow in the conduction band of a material normally regarded as a semiconductor the magnitude of such currents being much greater than those due to semiconductivity alone. The electrodes used could also be of semiconductor material.

The use of high permittivity materials assists in reducing the space-charge fields due to deep traps. The density of these deep trapping states must be kept small and the total density of deep trapping states in excess of about 0.35 e.v. is preferably such that the ratio of trap density to relative permitting is less than about $10^{15}$ For the device of FIGS. 5 and 5(a) employing a cadmium sulphide crystal the thickness of the crystal is typically about $5 \times 10^{-3}$ cm. With a density of donor centres of about $10^{19}$ to $10^{20}$ per cm.$^3$ the barrier layer may be only $10^{-7}$ cm. thick. For applied potentials of a few volts between the anode and cathode, current of about two amperes per square centimeter can be obtained.

Devices constructed in accordance with the invention have certain advantages over semiconductor devices from the point of view of the manufacturer, particularly in that the presence of impurities does not have such controlling influence on the characteristics of the device since the space-charge-limited current can be made to swamp the effects of trapping centres in the body of the material. Thus it is not essential that the device be placed in an inert atmosphere or in vacuo and provided with a strong casing to protect it against mechanical damage and extremes of temperature, especially as many of the materials used have high melting points and great chemical stability. The effect of temperature changes on the operation of the devices is far less marked than with semiconductor devices.

The three-electrode devices described, although resembling semiconductor devices in the materials and techniques used in their manufacture, are the true analogs of the vacuum triode and can be employed in a similar manner. By way of example, FIG. 11 shows the elements of an amplifying circuit employing a device in accordance with the invention. The device is indicated schematically by a crystalline body 61 with an anode 62, a cathode 63, and a control electrode 64 embedded in the crystalline body. The input is applied between terminals 65 and 66 connected to the control electrode 64 and the cathode 63 respectively. A battery 67 supplies the potential difference between the anode and cathode and the output of the device is taken from terminals 68 and 69 of an anode load resistor 70.

I claim:

1. A method of making a solid-state electrical translating device incorporating a body of crystalline material comprising the steps of forming an insulating crystalline body with a low density of trapping states, the ratio of trap density to the permittivity of said crystalline body being less than $10^{12}$, applying a first electrode to one surface of said body to form an ohmic contact therewith, applying a second electrode to form a non-ohmic contact with a face of said body opposed to said one surface, forming a steep-sided groove on one of the surfaces of the body and depositing electrode material on the grooved surface to form an electrically conductive layer in the bottom of the groove as a third electrode in contact with the material of said body.

2. A method of making a solid-state electrical translating device incorporating a body of crystalline material comprising the steps of forming an insulating crystalline body with a low density of trapping states, the ratio of trap density to the permittivity of said crystalline body being less than $10^{12}$, forming a first electrode in contact with one surface of said body, forming a second electrode spaced from said first electrode with said crystalline body therebetween, and forming a third electrode in contact with said body.

3. A method according to claim 2 wherein said first electrode is formed in ohmic contact with said one surface of said body.

4. A method according to claim 2 wherein said second electrode is in non-ohmic contact with said material.

5. A method according to claim 2 wherein said third electrode is in non-ohmic contact with said material.

6. A method according to claim 2 further comprising the step of forming donor centers in the surface layers of the surface of said body with which first electrode is in contact, thereby rendering said surface layers semiconductive to provide an ohmic contact between said first electrode and said body.

7. A method according to claim 6 wherein said first electrode is of indium, and wherein the step of forming said first electrode comprises heating an indium bead in contact with said one surface of said body and diffusing the indium into the surface layers of said one surface, the diffusion of the indium thereby forming said donor centers.

8. A method according to claim 1 wherein said deposition of electrode material on said grooved surface is performed by a process of vacuum evaporation.

9. A method according to claim 1 wherein said deposition of electrode material on said grooved surface is performed by a process of sputtering.

10. A method according to claim 1 further comprising the step of forming donor centers in the surface layers of said body with which said first electrode is in contact to render said surface layers semiconductive, whereby the semiconductive surface layers provide the ohmic contact between said first electrode and said body.

11. A method according to claim 10 wherein said first electrode is of indium, and wherein the step of applying said first electrode to said body comprises heating an indium bead in contact with said body and diffusing the indium into the surface layers of said body, the diffusion of the indium thereby forming said donor centers.

12. An electrical translating device comprising a body of crystalline material having first and second opposed faces, said body having a low density of trapping states, the ratio of trap density to the relative permittivity of said material being less than $10^{12}$, a first electrode in contact with said first face, a second electrode, said second electrode being disposed with respect to said first electrode to allow the flow of a space-charge-limited current of injected charge carriers through said body in the presence of a sufficient difference of potential between said first and second electrodes, and a third electrode in non-ohmic contact with said body, said third electrode being adapted for the application of a potential thereto to control the flow of said space-charge-limited current through said body.

13. A device according to claim 12 wherein said first electrode is in ohmic contact with said first face.

14. A device according to claim 12 wherein said second electrode is in non-ohmic contact with said second face.

15. A device according to claim 12 wherein the surface layers of said first face of said body are semiconductive.

16. A device according to claim 12 wherein said third electrode comprises a grid of spaced parallel bars embedded within said body between said first and second electrodes.

17. A device according to claim 16 wherein said bars comprise dendritic growths extending from one edge of said body.

18. A device according to claim 15 wherein said body comprises a single crystal of cadmium sulphide.

19. A device according to claim 15 wherein said crystalline body comprises a ceramic material.

20. A device according to claim 18 wherein said surface layers of said first face contain absorbed cadmium forming donor centers to render said surface layers semiconductive.

21. A device according to claim 18 wherein said surface layers of said first face contain the material of said first electrode diffused therein forming donor centers to render said surface semiconductive.

22. A device according to claim 21 wherein the material of said first electrode comprises indium.

23. An electrical translating device comprising a body of crystalline material having first and second opposed faces, said crystalline body having a low density of trapping states, the ratio of trap density to the relative permittivity of said material being less than $10^{12}$, a first electrode in ohmic contact with said first face, a second electrode in non-ohmic contact with said second face, said second electrode being disposed with respect to said first electrode to allow the flow of a space-charge-limited current through said body in the presence of a sufficient difference of potential between said first and second electrodes, and a third electrode in non-ohmic contact with said body, said third electrode being adapted for the application of a potential thereto to control the flow of said space-charge-limited current through said body.

24. A device according to claim 23 wherein said second and third electrodes each comprise a plurality of spaced parallel fingers, the fingers of the second and third electrodes being interdigitally arranged on said second face of said crystalline body.

25. A device according to claim 23 wherein the surface layers of said first face of said body are semiconductive to provide said ohmic contact between said first electrode and said first face.

26. A device according to claim 25 wherein the surface of said second face is provided with a plurality of grooves and wherein said third electrode comprises a plurality of bars each disposed within said grooves and wherein said second electrode comprises a plurality of spaced bars each disposed between said grooves.

27. A device according to claim 26 wherein said first electrode is of indium and wherein said semiconductive surface layers are formed by the diffusion of the indium into the surface layers by heating to form donor centers, the donor centers being provided to affect the electron energy levels at the contact of said first electrode and said first face, providing said ohmic contact therebetween for the injection of electrons into said body.

28. A device according to claim 26 wherein said second and third electrodes are comprised of the same material.

29. A device according to claim 27 wherein said body comprises a single crystal of cadmium sulphide.

30. A device according to claim 12 wherein said third electrode is in contact with said second face and disposed between said first and second electrodes.

31. An electrical translating device comprising a body of crystalline material having first and second opposed faces, said body being of a ferro-electric material, a first electrode in contact with said first face, a second electrode, said second electrode being disposed with respect to said first electrode to allow the flow of a space-charge-limited current of injected charge carriers through said body in the presence of a sufficient difference of potential between said first and second electrodes, and a third electrode in non-ohmic contact with said body, said third electrode being adapted for the application of a potential thereto to control the flow of said space-charge-limited current through said body.

32. An electrical translating device comprising a body of crystalline material having first and second opposed faces, said crystalline body being of a ferro-electric material, a first electrode in ohmic contact with said first face, a second electrode in non-ohmic contact with said second face, said second electrode being disposed with respect to said first electrode to allow the flow of a space-charge-limited current through said body in the presence of a sufficient difference of potential between said first and second electrodes, and a third electrode in non-ohmic contact with said body, said third electrode being adapted for the application of a potential thereto to control the flow of said space-charge-limited current through said body, said second and third electrodes each comprising a plurality of spaced parallel fingers, the fingers of the second and third electrodes being interdigitally arranged on said second face of said crystalline body.

References Cited by the Examiner

UNITED STATES PATENTS

| | | | |
|---|---|---|---|
| 2,208,455 | 7/1940 | Glaser et al. | 317—237 |
| 2,582,850 | 1/1952 | Rose | 317—235 |
| 2,789,258 | 4/1957 | Smith | 317—235 |
| 2,790,037 | 4/1957 | Shockley | 317—234 |
| 2,810,052 | 10/1957 | Bube et al. | 317—235 |
| 2,816,847 | 12/1957 | Shockley | 317—235 |
| 2,820,154 | 1/1958 | Kurshan | 307—88.5 |
| 2,820,841 | 1/1958 | Carlson et al. | 317—237 |
| 2,831,787 | 4/1958 | Emeis | 317—235 |
| 2,836,521 | 5/1958 | Longini | 317—235 |
| 2,900,531 | 8/1959 | Wallmark | 307—88.5 |
| 2,930,108 | 3/1960 | Williams | 29—25.3 |
| 2,933,619 | 4/1960 | Heywang | 307—88.5 |
| 2,948,050 | 8/1960 | Van Vessem | 29—25.3 |
| 2,948,951 | 8/1960 | Dillaby | 29—25.3 |
| 2,978,618 | 4/1961 | Myers | 307—88.5 |
| 3,128,530 | 4/1964 | Rouse et al. | 317—235 |

ARTHUR GAUSS, *Primary Examiner.*

GEORGE WESTBY, JOHN HUCKERT, *Examiners.*

J. ZAZWORSKY, D. PRESSMAN,
*Assistant Examiners.*